(12) United States Patent
Grosse-Uhlmann et al.

(10) Patent No.: US 11,933,653 B2
(45) Date of Patent: Mar. 19, 2024

(54) PROBE FOR PHASE TRANSITION DETECTION

(71) Applicant: Endress+Hauser Conducta GmbH+Co. KG, Gerlingen (DE)

(72) Inventors: Ronny Grosse-Uhlmann, Leipzig (DE); Andreas Eberheim, Waldheim (DE); Torsten Pechstein, Radebeul (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 307 days.

(21) Appl. No.: 17/471,232

(22) Filed: Sep. 10, 2021

(65) Prior Publication Data

US 2022/0082424 A1 Mar. 17, 2022

(30) Foreign Application Priority Data

Sep. 11, 2020 (DE) ..................... 10 2020 123 754.5

(51) Int. Cl.
*G01F 23/284* (2006.01)
*G01F 23/00* (2022.01)
*G01F 23/80* (2022.01)

(52) U.S. Cl.
CPC ........ *G01F 23/0046* (2013.01); *G01F 23/284* (2013.01); *G01F 23/80* (2022.01)

(58) Field of Classification Search
CPC ..... G01F 23/284; G01F 23/80; G01F 23/0046
See application file for complete search history.

(56) References Cited

U.S. PATENT DOCUMENTS

| 5,581,191 | A | * | 12/1996 | Yamaguchi | ............... G01N 9/24 73/61.41 |
| 2012/0204625 | A1 | * | 8/2012 | Beaupre | .................. B28C 7/024 73/54.31 |
| 2015/0377682 | A1 | * | 12/2015 | Gerding | .................. G01F 23/00 324/637 |
| 2018/0058900 | A1 | * | 3/2018 | Tevs | ..................... G01F 23/2845 |
| 2019/0063983 | A1 | * | 2/2019 | Schultheiss | .............. G01S 13/88 |

FOREIGN PATENT DOCUMENTS

| DE | 69007918 T2 | 10/1994 |
| DE | 102013223535 A1 | 5/2015 |
| DE | 102018127924 A1 | 5/2019 |
| WO | 2010101845 A1 | 9/2010 |

* cited by examiner

*Primary Examiner* — Alesa Allgood
(74) *Attorney, Agent, or Firm* — Mark A. Logan; Endress+Hauser (USA) Holding, Inc.

(57) ABSTRACT

The invention discloses a probe for detecting changes of a medium in a container, comprising: a process connection for connecting the probe to the container, wherein the process connection is part of a housing, especially, an integral part of a housing; the housing comprising at least one microwave chip for generating microwaves, which chip is connected to at least one antenna, wherein the antenna transmits and receives the microwaves in the direction of the medium; an interface for connecting the probe to a higher-level unit; and a data processing unit which is designed to receive data, especially, measurement data, from the higher-level unit via the interface and to transmit data to the higher-level unit, to activate the microwave chip, and to process signals that are dependent on the received microwaves.

11 Claims, 3 Drawing Sheets

PROBE FOR PHASE TRANSITION DETECTION

CROSS-REFERENCE TO RELATED APPLICATION

The present application is related to and claims the priority benefit of German Patent Application No. 10 2020 123 754.5, filed on Sep. 11, 2020, the entire contents of which are incorporated herein by reference.

TECHNICAL FIELD

The invention relates to a probe for detecting phase transitions in a container.

BACKGROUND

In general, there is a desire in industry to further optimize processes for cost reasons. Thus, various processes with various process media are frequently used in the same system in a chronologically consecutive manner. Primarily in the food industry, but also in the chemical, oil, and paper industries, it is therefore a goal to detect differences in media and to activate the associated process steps and minimize unnecessary product loss.

It is thus necessary in the food industry to clean the process lines at defined intervals. These cleaning processes result in transition phases between the cleaning medium and the product, which must be detected quickly and reliably. In addition, changes from product to product are also common, in which it is necessary to identify the corresponding purity or quality of the reaction product as quickly as possible. At present, conductivity sensors (for example, the applicant's CLS54) or turbidity sensors (for example, the applicant's OUSAF12) are frequently used for this purpose.

Optical sensors exhibit problems due to soiling of the windows and limitation in the case of clear liquids. The use of conductivity sensors frequently proves to be more than is necessary and too expensive. In addition, they are not suitable for organic solvents. In order to overcome limitations in the detection of certain media differences (color, conductivity), a combination of optical and conductivity sensors is conceivable. However, this approach proves to be too complex and cost-intensive. Another disadvantage of these sensors is that they project into the tube cross-section. As a result, they are not piggable, and product may adhere to the sensor surface.

SUMMARY

The object of the invention is to provide a non-invasive sensor for detecting phase transitions.

The object is achieved by a probe for detecting changes of a medium in a container, comprising a process connection for connecting the probe to the container, wherein the process connection is part of a housing, especially, an integral part of a housing; the housing comprising at least one microwave chip for generating microwaves, which chip is connected to at least one antenna, wherein the antenna transmits and receives the microwaves in the direction of the medium, an interface for connecting the probe to a higher-level unit; and a data processing unit designed to receive data, especially measurement data, from the higher-level unit via the interface and to transmit data to the higher-level unit, to activate the microwave chip, and to process signals that are dependent on the received microwaves.

One embodiment provides that the frequency of the microwaves is 100 to 10000 MHz, especially, 500 to 3000 MHz.

One embodiment provides that the antenna is designed as a strip conductor on a printed circuit board in the housing.

One embodiment provides that the process connection to the housing interior comprises an electrically conducting material, and the housing interior comprises an electrically conducting shield and forms a resonator space with a section, especially, an electrically conducting section, of the container, wherein a diaphragm made of an electrically non-conducting material closes the probe toward the medium.

One embodiment provides that the housing, in conjunction with a section, especially, an electrically conducting section, of the container and the process connection is designed in such a way that the emission of microwaves outside the container is prevented.

One embodiment provides that the shield is designed as a layer on a printed circuit board.

One embodiment provides that the process connection is designed as a flange, clamp connection, hygienic coupling or aseptic screw joint, SMS screw joint, Varivent N, or Neumo BioControl.

One embodiment provides that is designed for reflection or transmission measurement, and the antenna is designed as a contact sensor or a free-beam antenna.

One embodiment provides that the probe comprises at least one temperature sensor in the housing.

One embodiment provides that the data processing unit is designed to derive phase boundaries and phase transitions from the signals that are dependent on the received microwaves.

One embodiment provides that the housing is designed to be hermetically sealed.

One embodiment provides that the interface is designed as an inductive interface, and the probe can thus be connected to a measuring transducer.

This results in a simple, universally usable microwave probe for the rapid detection of a phase change of media, especially, of foods in various embodiments as a resonator or applicator variant.

BRIEF DESCRIPTION OF THE DRAWINGS

This is explained in more detail with reference to the following figures.

In the figures, the same features are identified by the same reference signs.

DETAILED DESCRIPTION

Figure 1:
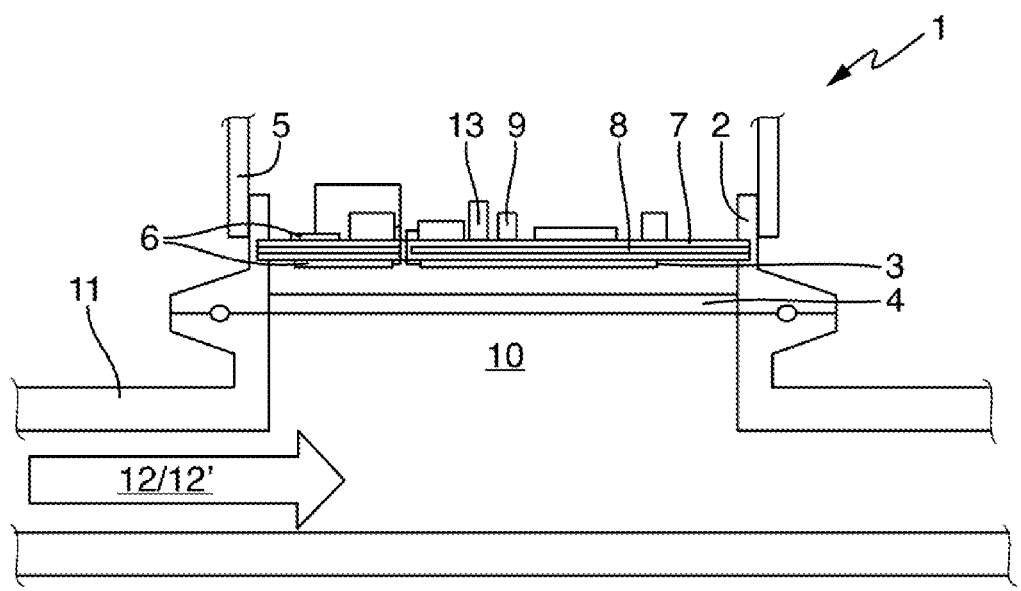
FIG. 1 shows an embodiment of the claimed probe in a cross-section (resonator design)

The claimed probe is denoted in its entirety by reference sign 1 and is shown in FIG. 1.

Proposed is a hermetically sealed probe 1 in a hygienic design, which detects phase boundaries of different liquid media in industrial processes by means of microwave technology. "Hermetic" in this connection shall be understood to mean that no fluid, such as the medium to be measured, air, or dust can penetrate from the outside. It also does not comprise any electrical feedthroughs.

The probe 1 operates in a frequency range of 100 to 10,000 MHz but preferably in a range of 500 to 3000 MHz. It operates with at least one frequency.

In one embodiment, not only one measuring frequency is used, but switching between several fixed frequencies occurs, or the measuring frequency is varied continuously in a defined range. Due to the different penetration depths or analyzable volume ranges available as a result, it is possible, in addition to the detection of phase boundaries of mutually exchanging media (see below), to detect the homogeneity of the medium 12 to be measured. In addition, these different frequencies can be used to optimize the identification of the different media.

In one embodiment, an additional measurement is carried out in the short-wave range, in which, in addition to the dielectric properties of the medium 12, the conductivity thereof is also detected.

By combining the probe 1 with another measuring method, for example a further sensor, for example with one of the conductivity sensors with a measurement close to the probe surface, two different signals can be correlated in order to thereby obtain additional information about the homogeneity of the medium. The monitoring of the distribution of pieces in a homogeneous medium, such as the distribution of pieces of pineapple in yogurt, can thus be monitored, for example. By varying parameters of the microwaves, i.e., the frequency or the amplitude, the penetration depth into the medium can be influenced.

In a first non-invasive embodiment which, however, is in contact with the medium, the probe 1 is equipped with a process connection 2, for example a clamp connection.

The probe thus comprises the process connection 2 for connecting the probe 1 to a container 11, wherein the process connection 2 is part of a housing 5, especially, an integral part of the housing 5. The container 11 is, for example, a tube, a tube section, a beaker, or the like. The housing 5 comprises at least one microwave chip 13 for generating microwaves, which chip is connected to at least one antenna 3, wherein the antenna 3 transmits and receives the microwaves in the direction of the medium 12. At the other end of the antenna 3, the probe 1 comprises an interface 14 for connecting the probe 1 to a higher-level unit 15, such as a measuring transducer. The probe 1 comprises a data processing unit 9, such as a microcontroller, which is designed to receive data, especially, measuring data, from the higher-level unit 15 via the interface 14 and to transmit data to the higher-level unit 15, to activate the microwave chip 13, and to process signals that are dependent on the received microwaves. The data processing unit 9 can derive phase boundaries and phase transitions based on the signals that are dependent on the received microwaves.

This process connection 2 is made of an electrically conducting, for example metallic, material or comprises an electrically conducting layer at least toward the housing interior. It connects a shield 8 located in the probe 1, for example on a printed circuit board 7, to a metallic pipe conduit, and thus forms a resonator space 10. The shield 8 is also a conducting layer. The space 10 is thus formed by the shield 8, the process connection 2, and, in sections, the container 11. The geometries and materials are adapted together with the medium 12 or media 12, 12' to be measured so that resonance results in the space 10.

On the media side, the probe 1 is delimited by a diaphragm 4 made of non-metallic material (e.g., PEEK). This diaphragm 4 is tightly connected to the process adaptation and is situated within the resonator space 10. In the housing interior in the resonator space 10 between the shield 8 and the diaphragm 4, an antenna 3 is mounted, for example, on a printed circuit board 7, for example as a strip conductor. In the interior in the resonator space 10 between the shield 8 and the diaphragm 4, a temperature sensor 6 is mounted, for example, to a printed circuit board 7. The antenna 3 and the temperature sensor 6 are electrically contacted with a data processing unit 9, including the microwave chip 13, outside the resonator space 10, for example via a plated through-hole of the printed circuit board 7.

Figure 5:
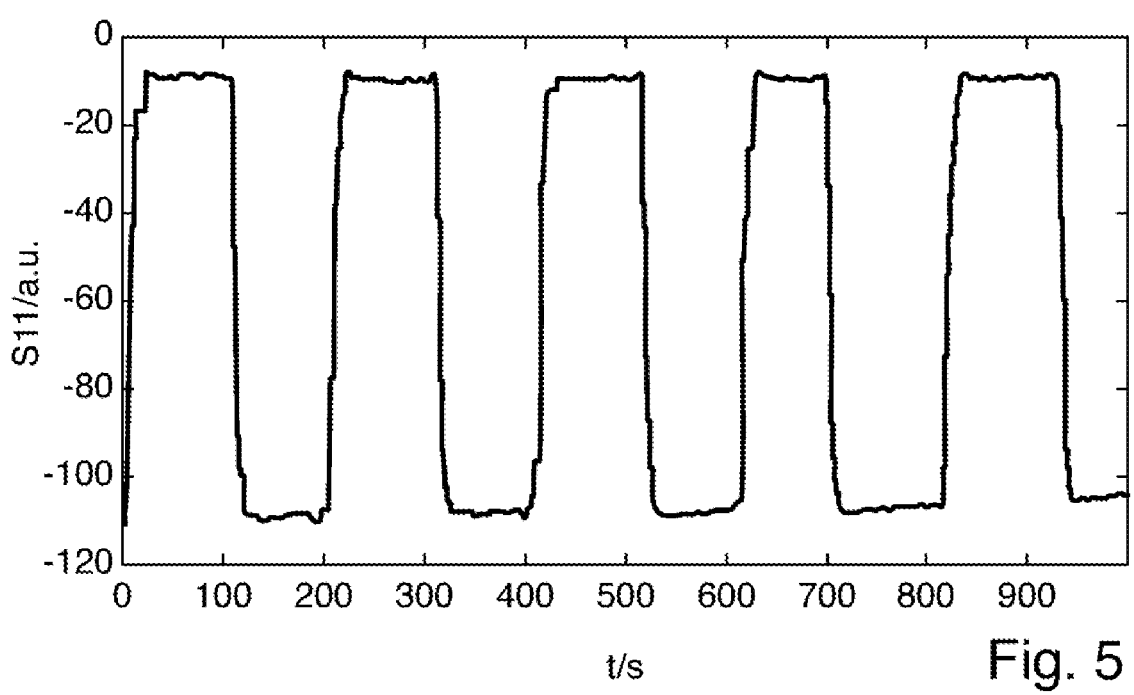
FIG. 5 shows measuring results.

By introducing a second medium 12' that is different from a first medium 12 into the pipe conduit, and thus into the resonator, the resonant frequency and the bandwidth of the resonance are changed as a result of the changing dielectric properties. A material-dependent measured value associated with the resonance curve can be the width, the amplitude, the slope in an edge, or the frequency shift. In one embodiment, this change is determined via the detection of the complex reflection parameter S11. For this purpose, the wave propagating to the measuring object and the returning wave must be separated from one another by components with directivity. In one embodiment, for example, the phase of the reflection parameter is determined. This is shown in FIG. 5 with the S11 parameters in arbitrary units, which are plotted against the time.

Instead of or in addition to the analysis of the complex reflection factor S11, the other scattering parameters S21, S12, and/or S22 can also be measured. Instead of or in addition to the measurement of the phase of the scattering factor, the magnitude thereof can also be measured.

Figure 4:
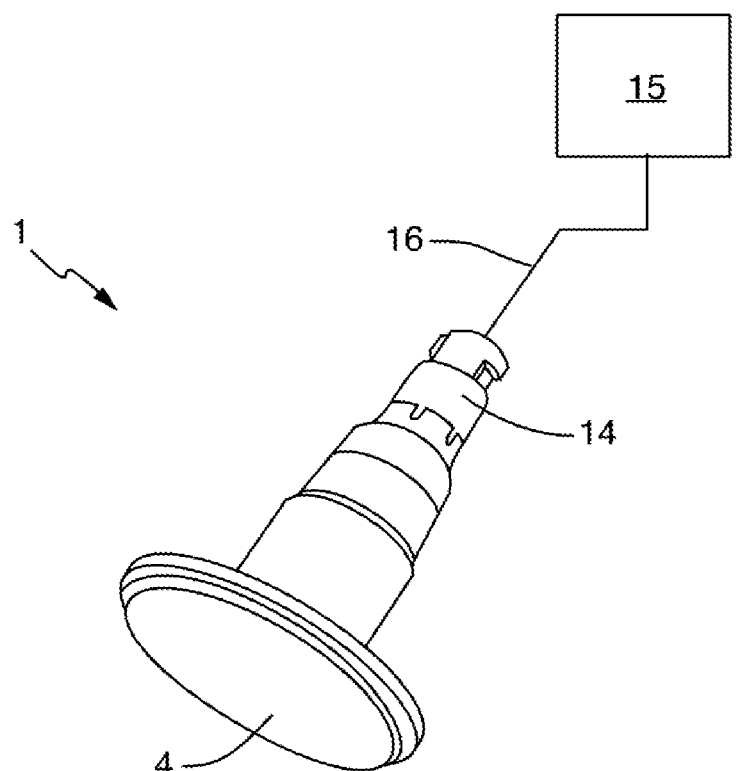
FIG. 4 shows an embodiment of the claimed probe in an overview.

The probe 1 comprises an inductive interface 14 for data and energy transmission. A cable 16 connects the probe 1 to a measuring transducer, i.e., a higher-level unit 15. This is shown in FIG. 4. The data are transmitted and received in digital form.

Instead of an inductive interface and a digital cable connection to a measuring transducer, the probe 1 in one embodiment is a compact device comprising an integrated operating panel, display options, and an analog power output.

Instead of an inductive interface and a digital cable connection to a measuring transducer, the probe 1 in one embodiment comprises a fixed cable connection with digital transmission.

Instead of only one antenna 3, a plurality of antennas can be provided, which differ in shape (antenna geometry) and thereby allow measurement in different planes (scatter field applicators for near-field measurements, antenna applicators for far-field measurements).

The probe 1 can also be equipped without a temperature sensor. In one embodiment, the temperature sensor 6 is on the resonator side of, for example, a printed circuit board 7, see FIG. 1, which is used for the temperature compensation of the medium 12. Also conceivable is a further temperature sensor on the side, facing away from the process, of a printed circuit board, for example, which temperature sensor is additionally used to compensate for the ambient temperature.

Instead of being designed as a strip conductor, the antenna 3 and the temperature sensor 6 can also be soldered onto the resonator side of the printed circuit board as wired components.

Instead of a clamp connection, any other process connections used in the industry are conceivable, such as hygienic coupling screw joint, aseptic screw joint, clamp ISO 2852, SMS screw joint, Varivent N, or Neumo BioControl, etc. in various diameters of the container 11. Especially, the variant described above comprising the resonator space 10 is independent of the pipe diameter.

In one embodiment, the probe 1 is fixedly attached in a pipe segment using flange connections. In this sense, the probe 1 can be offered for different pipe diameters.

In one embodiment, the process connection 2 is a metalized, electrically conductive plastic process connection.

In one embodiment, the diaphragm 4 is made of a non-metal, such as plastic, ceramic, or glass.

Instead of a resonator measurement as shown in FIG. 1, any other type of microwave measuring system is also conceivable.

Figure 2:
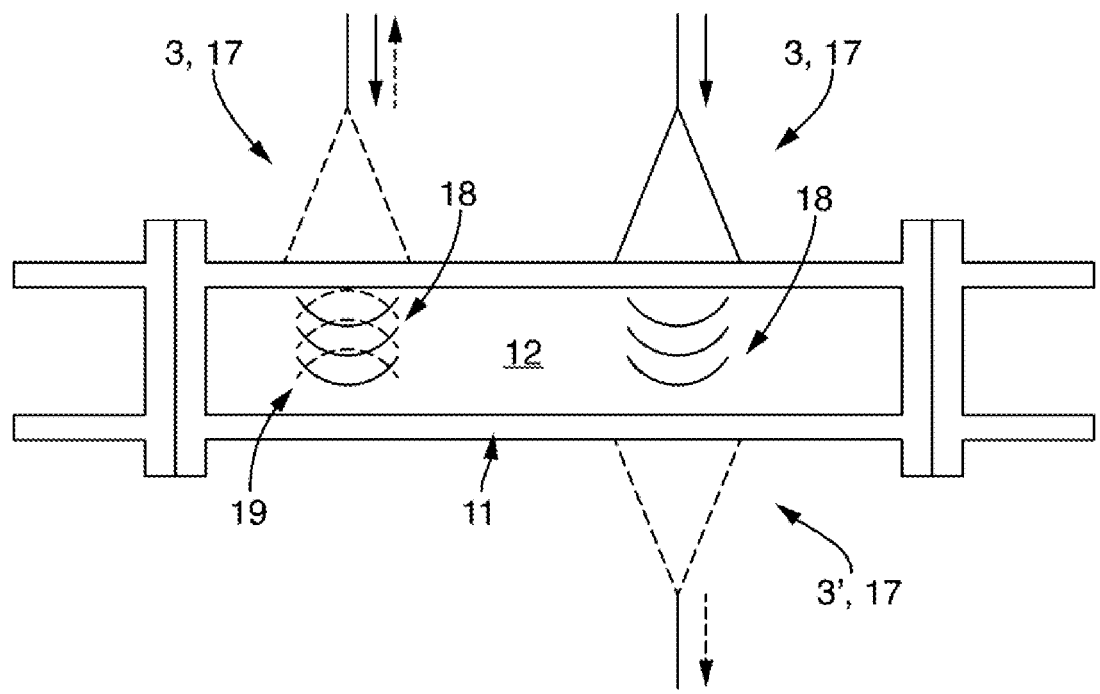
FIG. 2 shows an embodiment of the claimed probe (contact sensor)

FIG. 2 shows a reflection measurement (left) and a transmission measurement (right) with the embodiment of the antenna 3 as a contact sensor 17 or two contact sensors 17 (with corresponding antennas 3, 3') on a non-metal pipe segment 11. The emitted waves are denoted by reference sign 18, and the received waves are denoted by reference sign 19.

Figure 3:
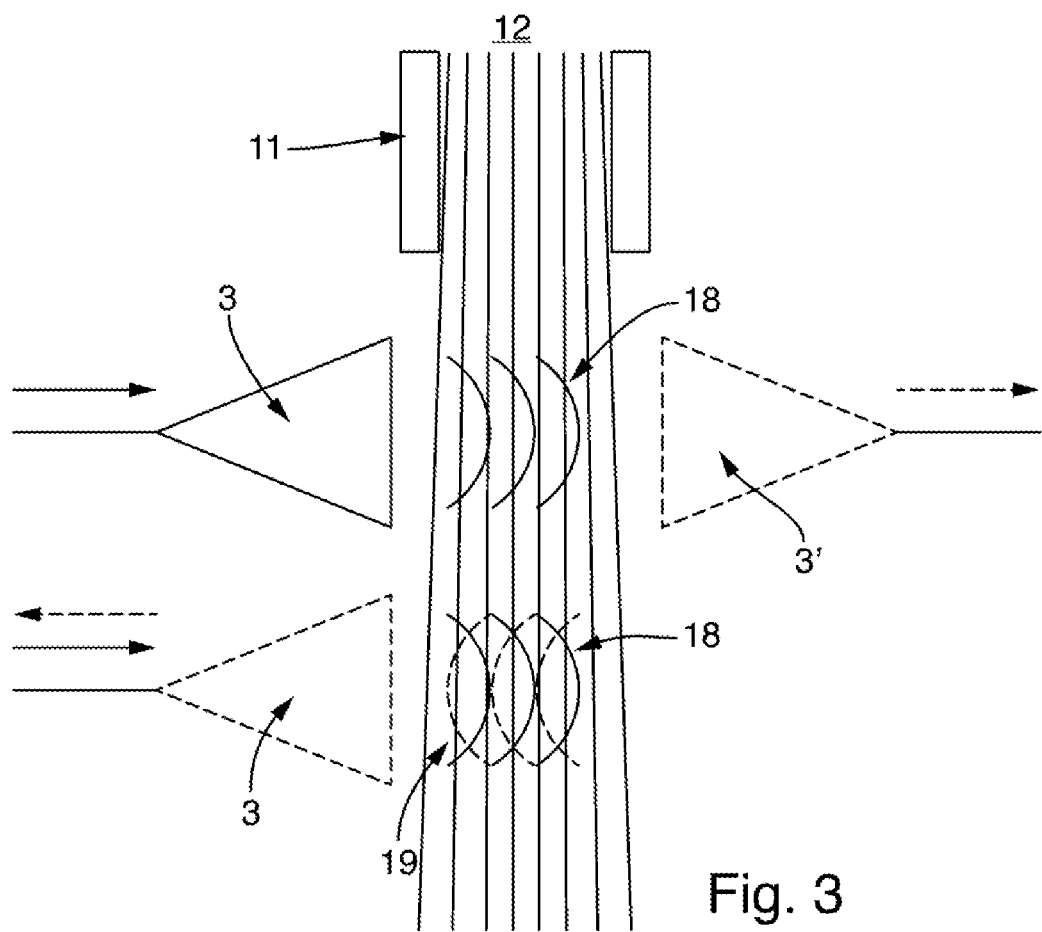
FIG. 3 shows an embodiment of the claimed probe (free beam)

FIG. 3 shows a reflection measurement (top) and a transmission measurement (bottom) with a free antenna 3 or two free antennas 3, 3' at an open media beam 12. One possible application here is a filling process.

In some branches of industry, so-called pigs are used to clean pipe conduits. Such cleaning pigs are made of plastic (having a dielectric constant of approximately 2 to 5) or of metal/plastic, and can therefore be easily detected. These can be detected by the probe 1.

For optimizing the energy requirement of the probe 1, a discontinuous mode of operation with maximum sequences, multitone or burst measurement is possible.

The invention claimed is:

1. A probe for detecting changes of a medium in a container, comprising:
    a process connection for connecting the probe to the container, wherein the process connection is an integral part of a housing; and
    the housing, comprising:
        at least one microwave chip for generating microwaves;
        at least one antenna connected with the at least one microwave chip, wherein the at least one antenna transmits and receives the microwaves in a direction of the medium;
        an interface for connecting the probe to a higher-level unit; and
        a data processing unit designed to receive data, including measurement data, from the higher-level unit via the interface and to transmit data to the higher-level unit, to activate the microwave chip, and to process signals that are dependent on the received microwaves,
    wherein the process connection to a housing interior comprises an electrically conducting material, and the housing interior comprises an electrically conducting shield, and
    wherein a diaphragm made of an electrically non-conducting material closes the probe toward the medium.

2. The probe according to claim 1, wherein the frequency of the microwaves is 100 MHz to 10000 MHz.

3. The probe according to claim 1, wherein the antenna is designed as a strip conductor on a printed circuit board in the housing.

4. The probe according to claim 1, wherein the electrically conducting material of the process connection and the electrically conducting shield of housing interior are configured to form a resonator space with an electrically conducting section of the container when the probe is connected with the container via the process connection.

5. The probe according to claim 4, wherein the shield is designed as a layer on a printed circuit board.

6. The probe according to claim 4, wherein the process connection is designed as a flange, a clamp connection, a hygienic coupling or aseptic screw joint, an SMS screw joint, a Varivent N, or a Neumo BioControl.

7. The probe according to claim 1, wherein the probe is designed for reflection or transmission measurement, and the antenna is designed as a contact sensor or a free-beam antenna.

8. The probe according to claim 1, further comprising: at least one temperature sensor in the housing.

9. The probe according to claim 1, wherein the data processing unit is designed to derive phase boundaries and phase transitions from the signals that are dependent on the received microwaves.

10. The probe according to claim 1, wherein the housing is designed to be hermetically sealed.

11. The probe according to claim 1, wherein the interface is designed as an inductive interface, and the probe can thus be connected to a measuring transducer.

* * * * *